US007965713B2

(12) United States Patent
Levy et al.

(10) Patent No.: US 7,965,713 B2
(45) Date of Patent: Jun. 21, 2011

(54) INTER-DOMAIN ROUTER COMPRISING A MODULE FOR DETERMINING ROUTE AGGREGATION

(75) Inventors: Thomas Levy, Paris (FR); Olivier Marce, Massy (FR)

(73) Assignee: Alcatel-Lucent, Paris (FR)

( * ) Notice: Subject to any disclaimer, the term of this patent is extended or adjusted under 35 U.S.C. 154(b) by 367 days.

(21) Appl. No.: 11/569,045

(22) PCT Filed: May 13, 2005

(86) PCT No.: PCT/FR2005/050325
§ 371 (c)(1),
(2), (4) Date: Jan. 18, 2007

(87) PCT Pub. No.: WO2005/114923
PCT Pub. Date: Dec. 1, 2005

(65) Prior Publication Data
US 2007/0223480 A1 Sep. 27, 2007

(30) Foreign Application Priority Data
May 14, 2004 (FR) ...................................... 04 05239

(51) Int. Cl.
*H04L 12/56* (2006.01)
(52) U.S. Cl. ......................... 370/392; 370/401; 370/351

(58) Field of Classification Search .................. 370/392, 370/395.1, 390, 396, 401, 351, 466, 238, 370/393, 252
See application file for complete search history.

(56) References Cited

U.S. PATENT DOCUMENTS
| 6,401,130 B1 | 6/2002 | Cain |
| 2002/0021675 A1* | 2/2002 | Feldmann ...................... 370/254 |
| 2006/0098577 A1* | 5/2006 | MeLampy et al. ............. 370/238 |

FOREIGN PATENT DOCUMENTS
| EP | 1 331 793 A1 | 7/2003 |
| GB | 2 320 159 A | 6/1998 |
| WO | WO 03/007556 A2 | 1/2003 |

* cited by examiner

*Primary Examiner* — Man Phan
*Assistant Examiner* — Nourali Mansoury
(74) *Attorney, Agent, or Firm* — Harness, Dickey & Pierce, P.L.C.

(57) ABSTRACT

The invention relates to an inter-domain router, for an Internet Protocol communications network, including a processing module to generate as a function of routing data outgoing messages intended for other routers which comprise information data representative of routes for routing IP datagrams and a control module to analyze at least some of the routing data, in order to define route aggregates as a function of selected configuration information, and for delivering output data representative of the route aggregates, so that the processing module can generate outgoing messages including information data representative of the route aggregates.

11 Claims, 1 Drawing Sheet

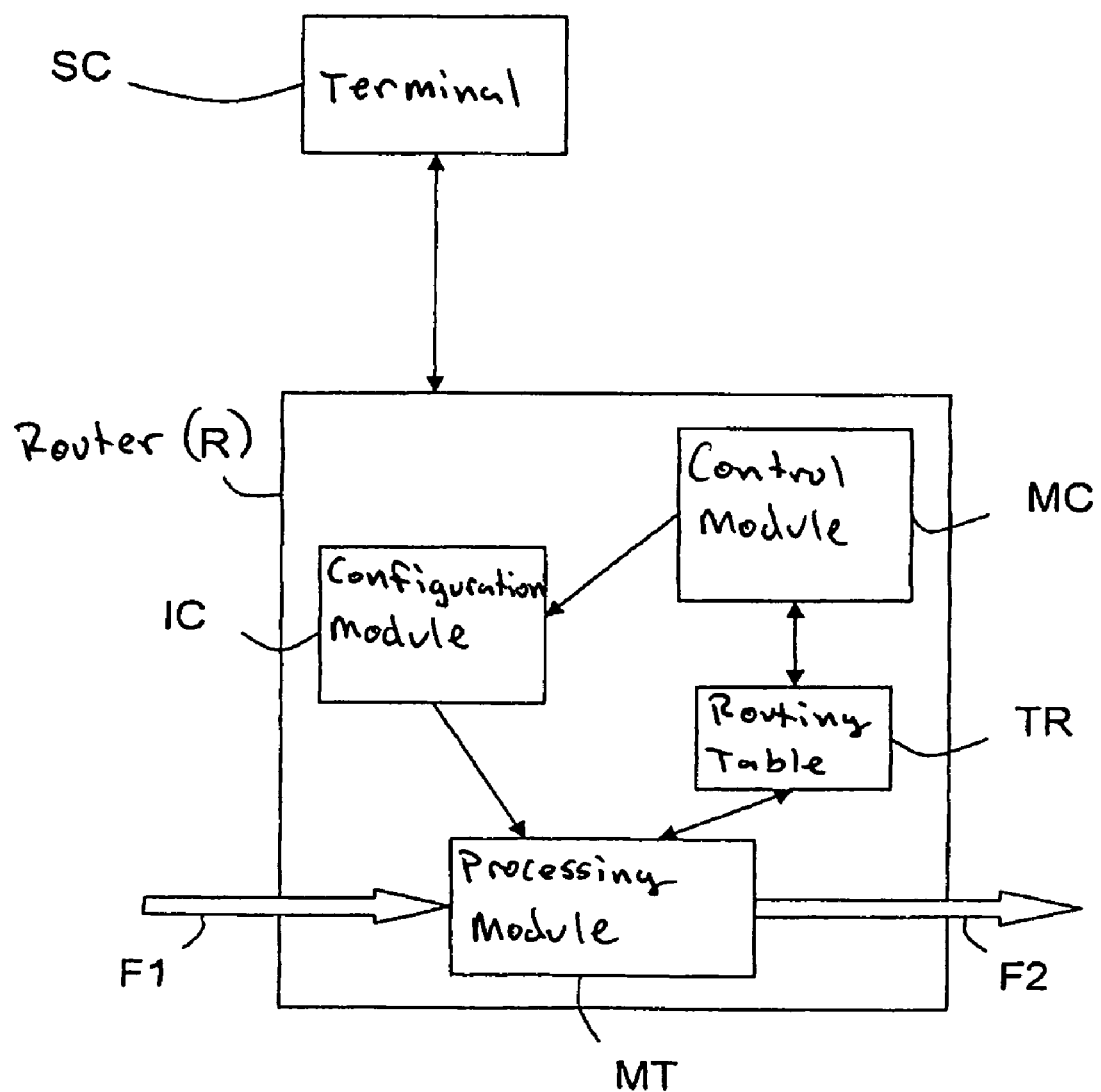
Single figure

INTER-DOMAIN ROUTER COMPRISING A MODULE FOR DETERMINING ROUTE AGGREGATION

The invention concerns the field of inter-domain routers of Internet Protocol (or IP) communication networks, and more precisely route aggregation in such routers.

Here "route" means information data for routing an IP datagram to a subsequent node of a network. This information data generally includes a plurality of attributes, for example that known as the "prefix", describing a set of contiguous IP addresses, or those known as "AS_Path" and "next_hop".

As the person skilled in the art knows, an IP network is a multi-domain context constituted of a sum of IP domains and/or sub-domains connected to each other by means of access equipments forming nodes, such as inter-domain routers.

Some inter-domain routers, for example those of the BGP (Border Gateway Protocol) type, can be configured to enable aggregation of a plurality of routes.

Configuration consists in supplying an inter-domain router with route aggregate prefixes (or aggregated routes) in order for it to use them during its routing operations. These prefixes are first determined by the operator of the network thanks, for the most part, to his knowledge of the inter-domain topology and/or a policy for the allocation of prefixes and/or routing data contained in routing tables, and are then entered manually or generated by a "cut-and-paste" type method before being transmitted to the routers concerned.

In practice, the determination of the route aggregate prefixes proves complex, in particular because the operator of a network generally has only a partial knowledge of the inter-domain topology (in fact he generally knows only the topology of his own domain, also known as the autonomous system (AS), and the topologies of the domains of its clients). Analysis of the routing data contained in the routing tables undoubtedly widens the field of investigation of the aggregates. However, the very large number of routes (typically 100 000) defined by the routing data stored in each inter-domain router and the frequent evolution of routes render the determination of route aggregate prefixes complex and costly.

Furthermore, the route aggregation prefixes being entered or generated completely manually, they are frequently erroneous, which compromises the routing of IP datagrams.

An object of the invention is therefore to improve on this situation, and in particular to reduce or even eliminate route aggregation address configuration errors in inter-domain routers.

To this end the invention proposes an inter-domain router, for an IP network, comprising processing means responsible for generating, as a function of routing data, outgoing messages to other routers comprising information data representative of routes for routing IP datagrams.

This router, which is of the BGP type, for example, is characterized in that it further comprises control means responsible for analyzing at least some of the routing data in order to define route aggregates as a function of chosen configuration information and for delivering output data representative of these route aggregates in order for the processing means to be able to generate outgoing messages including information data representative of said route aggregates.

The output data preferably consists of aggregate prefixes.

The control means may be adapted to deliver their output data in a grouped form once they have defined a number of route aggregates greater than or equal to a chosen number.

Moreover, the router preferably comprises configuration means fed with output data by the control means and responsible for generating configuration messages representative of the output data that they receive and intended for the processing means in order for them to generate the corresponding outgoing messages. In this case, the configuration means are adapted to generate a configuration message only when they receive an external request, for example.

Moreover, the router may be adapted to send the output data delivered by its control means to network management equipment. In this case, the external request for triggering the generation of a configuration message preferably comes from the network management equipment.

When the routing data defining a route includes attributes of different types, as is generally the case, the control means are preferably and advantageously adapted at least to compare the attributes of the same chosen type which define different routes with each other and to consider routes having comparable (or common) attributes of each chosen type as suitable to be aggregated. The chosen configuration information then defines each type of attribute that is the subject of a comparison.

In this case, the control means are advantageously responsible for comparing at least the attributes known as prefixes with each other, two prefixes then being considered comparable (or common) if one encompasses the other or if they are adjacent and of the same size (i.e. if the combination of the two prefixes forms a prefix of larger size).

Finally, the routing data that is the subject of the analysis is preferably stored in a routing table of the router, which is advantageously updated by the processing means using the information data contained in incoming messages that they receive from other routers.

Other features and advantages of the invention will become apparent on examining the following detailed description and the appended drawing, the single FIGURE whereof illustrates diagrammatically one embodiment of an inter-domain router according to the invention coupled to a configuration terminal of a network operator. The appended drawing constitutes part of the description of the invention as well as contributing to the definition of the invention, if necessary.

An object of the invention is to enable automated determination of route aggregates in an inter-domain router of an Internet Protocol (or IP) communication network.

In the following description it is considered, by way of illustrative example, that the inter-domain router is of the BGP (Border Gateway Protocol) type. Here "BGP router" means a router using a BGP type protocol enabling it to exchange so-called external routing information with another BGP router belonging either to the same IP domain (or autonomous system (AS)) as itself or to an IP domain other than its own.

As shown diagrammatically and functionally in the single FIGURE, a router R according to the invention includes firstly a routing table TR which stores routing data enabling it to route IP datagrams to a subsequent router.

The router R also includes a processing module MT coupled to the routing table TR and responsible, firstly, for receiving incoming messages (indicated by the arrow F1) from the BGP routers to which its router R is connected including information data representative of routes for routing IP datagrams, secondly, for updating the routing table TR using the information data contained in the incoming messages received and, thirdly, for generating, as a function of the routing data stored in the routing table TR, outgoing messages (indicated by the arrow F2) also containing information data representative of routes for routing IP datagrams and intended for the BGP routers connected to its router R.

The information data generally includes a plurality of attributes, for example that known as the "prefix", describing a set of contiguous IP addresses, or those known as "AS_Path" and "next_hop".

Thanks to these incoming and outgoing messages, the information data defining the routes can propagate from one BGP router to another BGP router. This enables their routing tables TR to be fed with updated routing data. Remember that a routing table TR of a BGP router generally includes routing data corresponding to 100 000 different "prefixes".

The router R further comprises a configuration interface IC coupled to the processing module MT and fed with configuration data by the operator of the network to which its router belongs via a terminal SC. When it has been transformed by the configuration interface IC, this configuration data is supplied to the processing module MT in order to process incoming messages, the routing table and outgoing messages.

According to the invention, the router R also comprises a control module MC responsible firstly for analyzing at least some of the routing data stored in the routing table TR in order to define route aggregates as a function of chosen configuration information.

It is important to note that the configuration module MC can be configured to analyze all the routing data stored in the routing table TR of its router R or only a selection thereof (selected by sampling, for example).

When the routing data that defines a route in the routing table TR includes attributes of different types, as is generally the case, their analysis by the control module MC consists in comparing the attributes that define different routes with each other. The comparison may apply to a single type of attribute or to several types, depending on the chosen configuration information that defines each type of attribute to be the subject of a comparison.

When it emerges from a comparison that attributes of the same type(s) but defining different routes are common to said routes (or comparable), then those routes are considered by the control module MC as overlapping and may be aggregated. At least two routes may be aggregated in this way.

The comparison preferably applies at least to the attributes known as prefixes. In this case two prefixes are considered as common or comparable when one encompasses the other or they are adjacent and of the same size (i.e. when the union of the two prefixes forms a larger prefix). A first prefix encompasses a second prefix when the set of addresses constituting the second is included in the set of addresses constituting the first.

When the control module MC has defined an aggregation of routes (or route aggregate), it delivers output data representative of that route aggregate.

This output data preferably consists of aggregated prefixes, but this is not obligatory if they are representative of a route aggregate. Here "aggregated prefix" means the union, in the mathematical sense of the term, of the common (or comparable) prefixes defining different routes. Consequently, in the presence of a first prefix encompassing at least one second prefix, the aggregated prefix is the first prefix or, in the case of adjacent prefixes, the prefix resulting from the union of those prefixes.

It is important to note that the control module MC can be configured to deliver its output data in a grouped form, once it has defined a number of route aggregates greater than or equal to a chosen number, for example equal to 10. In this case it includes a route aggregate counter that is reset to zero each time that an output data group is delivered.

The output data delivered by the control module MC is intended to enable the processing module MT to generate outgoing messages including information data representative of the route aggregates. In other words, the output data enables the router R to be configured, via its processing module MT, using aggregated prefixes determined internally by the control module MC.

As shown, the control module MC is preferably coupled to the configuration interface IC in order to feed it with output data representative of the route aggregates.

In this case, the configuration interface IC is adapted to generate configuration messages representative of the output data that it receives from the control module MC and to communicate them to the processing module MT in order for it to generate outgoing messages defining route aggregates addressed to adjacent BGP routers.

A variant may be envisaged in which the control module MC is coupled directly to the processing module MT in order to feed it with output data.

The integration into the routing table TR of the routing data defined by the control module MC and defining a route aggregate (or aggregated routes) is preferably effected by the processing module MT at the time of its updates.

It is preferable, although not obligatory, for the output data to be communicated to the processing module MT of a router R only after manual validation of the operator of the network. To this end, the operator may send an (external) configuration request to the configuration interface IC via a terminal SC, for example.

The router R, and for example its configuration interface IC, may be adapted to send a terminal SC of the operator of the network the output data that is delivered by its control module MC. This may be effected at the initiative of the control module MC, at the initiative of the configuration interface IC when it receives output data from the control module MC or at the initiative of the operator. Accordingly, the operator can analyze the output data displayed on the monitor of his terminal SC. If the operator deems the proposed route aggregate to be acceptable, he can then send an (external) configuration request to the configuration interface IC via his terminal SC.

The (external) configuration request preferably contains the designation of the output data, in order to enable the configuration interface IC to recognize it among all the data that it receives from the control module MC. This configuration request is then handled by the configuration interface IC of the router R concerned, which generates a configuration message to the processing module MT, as indicated hereinabove.

The processing module MT, the control module MC and the configuration interface IC of an inter-domain router R according to the invention may take the form of electronic circuits, software (or electronic data processing) modules, or a combination of circuits and software.

The invention is not limited to the inter-domain router embodiments described hereinabove by way of example only, and encompasses all variants that the person skilled in the art might envisage that fall within the scope of the following claims.

The invention claimed is:

1. An Inter-domain router, for an Internet Protocol communication network, comprising:
   a processing module configured to generate, as a function of routing data defining a route including attributes of different types, outgoing messages addressed to other routers, the outgoing messages including information data representative of routes for route aggregation associated with routing Internet Protocol datagrams; and
   a control module configured to, first analyze routing prefixes associated with Internet Protocol addresses, second analyze at least some of said routing data not associated with said routing prefixes, define aggregates of the routes as a function of chosen configuration information and based on the first analysis and the second analysis, deliver output data representative of said route aggregates, with a view to the generation by said processing module of the outgoing messages including the information data representative of said route aggregates, compare at least attributes of the same chosen type defining different routes with each other, and consider as suitable to be aggregated routes having comparable attributes of each chosen type, wherein said chosen configuration information defines each type of attribute that is a subject of said comparison.

2. The router according to claim 1, wherein said control module is configured to deliver the output data representative of aggregated prefixes.

3. The router according to claim 1, wherein said control module is configured to deliver said output data in a group, if a number of route aggregates in the group is greater than or equal to a chosen number.

4. The router according to claim 1, comprising:
a configuration module configured to generate configuration messages based on the output data received from the control module and addressed to said processing module, such that the processing module generates the outgoing messages.

5. The router according to claim 4, wherein said configuration module is configured to generate a configuration message on reception of an external request.

6. The router according to claim 1, wherein said control module is configured to send said output data to a terminal to which said router is connected.

7. The router according to claim 5, wherein
said control module is configured to send said output data to a terminal to which it is connected, and
said external request comes from said terminal.

8. The router according to claim 1, wherein
said control module is configured to compare attributes describing a set of contiguous addresses, two addresses of the set of contiguous addresses are comparable one of when one encompasses the other and when the two addresses are adjacent and of the same size, and
one address encompasses the other when a first set of addresses is included in a second set of addresses.

9. The router according to claim 1, comprising:
a routing table configured to store said routing data.

10. The router according to claim 9, wherein said processing module is configured to
receive from one or more routers incoming messages including the information data representative of the routes for routing the Internet Protocol datagrams, and
update said routing table based on said information data contained in a received message.

11. The router according to claim 1, wherein said router is a Border Gateway Protocol router.

* * * * *